US006771907B1

(12) United States Patent
Yoshifuji et al.

(10) Patent No.: US 6,771,907 B1
(45) Date of Patent: Aug. 3, 2004

(54) OPTICAL RING SYSTEM

(75) Inventors: Yuuki Yoshifuji, Tokyo (JP); Shuichi Iida, Tokyo (JP); Takashi Yamazaki, Tokyo (JP); Youko Nakabayashi, Tokyo (JP); Shinya Nakamura, Tokyo (JP); Kimio Ozawa, Tokyo (JP); Naoki Ando, Tokyo (JP); Hitoshi Kikuchi, Miyagi (JP); Tukasa Haga, Miyagi (JP); Hiromitu Watanabe, Miyagi (JP); Minoru Shinta, Tokyo (JP); Hitoshi Takeshita, Tokyo (JP); Shinobu Sasaki, Tokyo (JP); Ryou Yamada, Tokyo (JP); Naoya Henmi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/576,240

(22) Filed: May 24, 2000

(30) Foreign Application Priority Data

May 24, 1999 (JP) .......................................... 11-143859

(51) Int. Cl.[7] .......................... H04J 14/00; H04B 10/20
(52) U.S. Cl. .............................. 398/59; 398/45; 398/51
(58) Field of Search ................................ 359/110, 119, 359/123, 124, 125, 143; 398/3, 7, 12, 19, 33, 45, 51, 54, 59

(56) References Cited

U.S. PATENT DOCUMENTS

| 5,612,805 A | * | 3/1997 | Fevrier et al. ................. 398/83 |
| 6,046,833 A | * | 4/2000 | Sharma et al. ................ 398/48 |
| 6,163,527 A | * | 12/2000 | Ester et al. .................. 370/228 |
| 6,233,074 B1 | * | 5/2001 | Lahat et al. .................. 398/79 |
| 6,249,510 B1 | * | 6/2001 | Thompson .................... 370/223 |
| 6,272,154 B1 | * | 8/2001 | Bala et al. .................. 370/535 |
| 6,314,097 B1 | * | 11/2001 | Ohara ......................... 370/392 |

FOREIGN PATENT DOCUMENTS

| JP | 6-311139 | 11/1994 |
| JP | 10-164025 | 6/1998 |
| JP | 11-103275 | 4/1999 |

* cited by examiner

Primary Examiner—Leslie Pascal
Assistant Examiner—Dzung Tran
(74) Attorney, Agent, or Firm—Young & Thompson

(57) ABSTRACT

An optical ring system having: a wavelength demultiplexer to which wavelength-multiplexed optical signal to be sent through an optical fiber from a previous node of multiple nodes is input and in which optical signal with each wavelength assigned to itself is demultiplexed; an optical ring device which is disposed in a predetermined node of the multiple nodes to the each wavelength assigned and which is composed of a failure existence judging part which terminates an overhead of each optical signal with a wavelength demultiplexed by the wavelength demultiplexer and judges whether a failure occurs in regard to a wavelength in a previous section through which optical signal with the assigned wavelength is sent, and a switching part which, when the failure existence judging means determines the occurrence of failure, selects a path that allows optical signal with the wavelength to be transmitted to the previous node while avoiding the previous section incurring the failure; and a wavelength multiplexer which multiplexes optical signal to be output from the optical ring part and then outputs it to an optical fiber connected to a next node.

13 Claims, 16 Drawing Sheets

(Path-Ring Switch)

(Path-Ring Switch)

US 6,771,907 B1

OPTICAL RING SYSTEM

FIELD OF THE INVENTION

This invention relates to an optical ring system that is composed of multiple nodes connected in the form of a ring, and more particularly to, an optical ring system to process optical signal with multiple wavelengths.

BACKGROUND OF THE INVENTION

Owing to an increase in amount of communications caused by the popularization of the Internet etc. and the emergence of wideband data service, the enhancement of transfer capacity in backbone network has been desired increasingly. Some of Routers and ATM (asynchronous transfer mode) switches as a device for data service are already provided with a wideband interface at a transfer rate of Gbit/sec, and therefore it is difficult to connect such a device to an existing synchronous network. So, a technology to connect to the network while skipping "a device to do the time-division multiplexing of low-order group of signal into high-order group of signal", an interface of the existing synchronous network, or a WDM (wavelength division multiplexing) technology having a transfer performance more than Gbit/sec to each wavelength has been required.

FIG. 1 shows a prior point-to-point wavelength multiplexing transmission system. First to N-th optical wavelength transmitters $11_1$, $11_2$, . . . , $11_N$, respectively, convert first to N-th optical signal into optical signal of intrinsic wavelength $\lambda_1$ to $\lambda_N$, and then output it to an optical wavelength multiplexer 12. The optical wavelength multiplexer 12 multiplexes these optical signal and then outputs it to transmission line 13 connected on the output side. An optical amplifier 14, suitably provided on the transmission line 13, conducts the recovery of deteriorated light in optical signal with wavelength $\lambda_1$ to $\lambda_N$ multiplexed.

An optical wavelength demultiplexer 15 is input optical signal multiplexed from transmission line 16, and demultiplexes it into former optical signal of wavelength $\lambda_1$ to $\lambda_N$, and then corresponding first to N-th optical wavelength receivers $16_1$, $16_2$, . . . , $16_N$ reproduces the original signal.

Such a point-to-point wavelength multiplexing transmission system as shown in FIG. 1 is equipped with no protection function to protect the transmission of signal when it is subject to a failure such as disconnection of optical fiber to form the transmission lines 13, 16, and malfunction of the optical transmitter/receiver.

The simplest method to provide the optical wavelength multiplexing protection function is to detect a failure at each optical terminal node to provide the protection at multiplexing level of all wavelengths, i.e. in unit of one optical fiber.

FIG. 2 shows an example of optical ring system that employs such a protection method suggested so far. This optical ring system, which is disclosed in Japanese patent application laid-open No. 6-61986 (1994), comprises a four-fiber ring which is of four optical fibers 31 to 34 connected in the form of ring among a master station 21 and first to third slave stations 22 to 24. Of the four fibers, two optical fibers 31, 32 compose work line, i.e. actually-working line, and the remaining two optical fibers 33, 34 compose protection line, i.e. backup line.

The optical ring system in FIG. 2 is not subject to failure. In FIG. 2, master clock output from a clock-supplying device 25, which is disposed in the master station 21, is supplied sequentially from the first to third slave stations 22 to 24.

FIG. 3 shows a case that the work line between the master station 21 and the first slave station 22 in the optical ring system is subject to a failure 41. When the failure 41 occurs on the work line composed of the first and second optical fibers $31_1$, $32_1$, the transmission line is switched so that two optical fibers $33_1$, $34_1$ to compose the protection line in this section can supply the master clock. Then, between the first slave station 22 and the master station 21, the transmission line through the second slave station 23 and the third slave station 24 supplies the master clock like that in FIG. 2.

FIG. 4 shows a case that, between the master station 21 and the first slave station 22 in this optical ring system, not only the work line but also the protection line is subject to a failure 42. When the failure 42 occurs on both the work line composed of the first and second optical fibers $31_1$, $32_1$ and the protection line composed of the third and fourth optical fibers $33_1$, $34_1$, the master clock is supplied through optical fiber $32_4$ in the direction from the master station 21 to the third slave station 24.

Although the transmission of master clock is explained in this example. the first to fourth optical fibers 31 to 34 respectively transmit multiplexing optical signal with multiple wavelengths $\lambda_1$ to $\lambda_N$, and when optical signal with more than one of the wavelengths is subject to a failure, the switching of transmission line is conducted in like manner described above.

Thus, in the case that, as shown in FIG. 1, optical signal with multiple wavelengths $\lambda_1$ to $\lambda_N$ is multiplexed in one transmission line, even when the transmission line of partial wavelength is subject to a failure, the protection of signal transmission line is conducted by unit of one optical fiber. This means that due to failure of one wavelength, the transmission line of optical signal to the remaining wavelengths has to be switched.

In recent years, optical amplification technology and wavelength multiplexing technology have been developed abruptly. Along with this, the multiplexing number N of optical signal to be transmitted through one optical fiber has increased. Under this background, if even for a failure concerning one wavelength the switching of optical signal to all the remaining wavelengths must be conducted, then optical signal to the wavelengths operated normally may be influenced by an instantaneous shut-off by the switching operation to switch into the protection line. Also, due to the rerouting required when conducting the switching operation of transmission line, delay in transmission of signal occurs, and as a whole the efficiency in use of wavelength band lowers.

SUMMARY OF THE INVENTION

Accordingly, it is an object of the invention to provide an optical ring system that when a failure occurs as to only part of wavelengths in point-to-point wavelength multiplexing transmission system, the protection function is conducted to only a wavelength subject to the failure.

According to the invention, an optical ring system, comprises:

a wavelength demultiplexing means to which wavelength-multiplexed optical signal to be sent through an optical fiber from a previous node of multiple nodes composing a ring network is input and in which optical signal with each wavelength assigned to itself is demultiplexed;

an optical ring means which is provided in a predetermined node of the multiple nodes to the each wavelength assigned and which is composed of a failure existence judging means which terminates an overhead of each optical signal with a wavelength demultiplexed by the wavelength demultiplexing means and judges whether a failure occurs in regard to a wavelength in a previous section through which optical signal with the assigned wavelength is sent, and a switching means which, when the failure existence judging means determines the occurrence of failure, selects a path that allows optical signal with the wavelength to be transmitted to the previous node while avoiding the previous section incurring the failure; and a wavelength multiplexing means which multiplexes optical signal to be output from the optical ring means and then outputs it to an optical fiber connected to a next node composing the ring network.

In this invention, the optical ring means is provided for each wavelength in each node, and after being demultiplexed by the wavelength demultiplexing means, optical signal with a wavelength assigned to the optical ring means is input. The optical ring means terminates the overhead of optical signal assigned and determines whether a failure occurs. In regard to optical signal with the assigned wavelength, when a failure is detected in the previous section, the switching means is controlled to offer the recovery from failure. Optical signal passed through the switching means is multiplexed again with optical signal with the other wavelength by the wavelength multiplexing means when sent to the next node. Thus, the optical ring system of this invention is configured as if the ring network is provided for each wavelength. Therefore, when a failure occurs as to only part of wavelengths in point-to-point wavelength multiplexing transmission system, the protection function can be conducted to only a wavelength subject to the failure.

Also, according to another aspect of the invention, an optical ring system, comprises:

a wavelength demultiplexing means to which wavelength-multiplexed optical signal to be sent through an optical fiber from a previous node of multiple nodes composing a ring network is input and in which optical signal with each wavelength assigned to itself is demultiplexed;

an optical ring means which is provided in a predetermined node of the multiple nodes to the each wavelength assigned and which is composed of a failure existence judging means which terminates an overhead of each optical signal with a wavelength demultiplexed by the wavelength demultiplexing means and judges whether a failure occurs in regard to a wavelength in a previous section through which optical signal with the assigned wavelength is sent, a switching means which, when the failure existence judging means determines the occurrence of failure, selects a path that allows optical signal with the wavelength to be transmitted to the previous node while avoiding the previous section incurring the failure, and a wavelength changing means which changes the wavelength of optical signal to be output from the switching means; and a wavelength multiplexing means which multiplexes optical signal be output from the optical ring means and then outputs it to an optical fiber connected to a next node composing the ring network.

In this aspect of the invention, the optical ring means is provided for each wavelength in each node, and after being demultiplexed by the wavelength demultiplexing means, optical signal with a wavelength assigned to the optical ring means is input. The optical ring means terminates the overhead of optical signal assigned and determines whether a failure occurs. In regard to optical signal with the assigned wavelength, when a failure is detected in the previous section, the switching means is controlled to offer the recovery from failure. Optical signal passed through the switching means is multiplexed again with optical signal with the other wavelength by the wavelength multiplexing means when sent to the next node. Thus, the optical ring system of this invention is configured as if the ring network is provided for each wavelength. Therefore, when a failure occurs as to only part of wavelengths in point-to-point wavelength multiplexing transmission system, the protection function can be conducted to only a wavelength subject to the failure. In addition, by the wavelength changing means, the output-side wavelength is changed. Therefore, this system can be flexibly applied even to a system where wavelength assignment to optical signal is predetermined.

According to another aspect of the invention, an optical ring system, comprises:

a wavelength demultiplexing means to which wavelength-multiplexed optical signal to be sent through an optical fiber from a previous node of multiple nodes composing a ring network is input and in which optical signal with each wavelength assigned to itself is demultiplexed;

an optical ring means which is provided in a predetermined node of the multiple nodes to the each wavelength assigned and which is composed of a failure existence judging means which terminates an overhead of each optical signal with a wavelength demultiplexed by the wavelength demultiplexing means and judges whether a failure occurs in regard to a wavelength in a previous section through which optical signal with the assigned wavelength is sent, a switching means which, when the failure existence judging means determines the occurrence of failure, selects a path that allows optical signal with the wavelength to be transmitted to the previous node while avoiding the previous section incurring the failure, and a bandwidth narrowing means which narrows the bandwidth of optical signal to be output from the switching means; and a wavelength multiplexing means which multiplexes optical signal to be output from the optical ring means and then outputs it to an optical fiber connected to a next node composing the ring network.

In this aspect of the invention, the optical ring means is provided for each wavelength in each node, and after being demultiplexed by the wavelength demultiplexing means, optical signal with a wavelength assigned to the optical ring means is input. The optical ring means terminates the overhead of optical signal assigned and determines whether a failure occurs. In regard to optical signal with the assigned wavelength, when a failure is detected in the previous section, the switching means is controlled to offer the recovery from failure. Optical signal passed through the switching means is multiplexed again with optical signal with the other wavelength by the wavelength multiplexing means when sent to the next node. Thus, the optical ring system of this invention is configured as if the ring network is provided for each wavelength. Therefore, when a failure occurs as to only part of wavelengths in point-to-point wavelength multiplexing transmission system, the protection function can be conducted to only a wavelength subject to the failure. In addition, by the bandwidth narrowing means, the bandwidth of optical signal output is narrowed. Therefore, the interaction between optical signals in multiplexing can be reduced, thereby enhancing the efficiency and quality in multiplexing.

BRIEF DESCRIPTION OF THE DRAWINGS

The invention will be explained in more detail in conjunction with the appended drawings, wherein.

DESCRIPTION OF THE PREFERRED EMBODIMENTS

The preferred embodiments will be explained below.

First Embodiment

Figure 1:
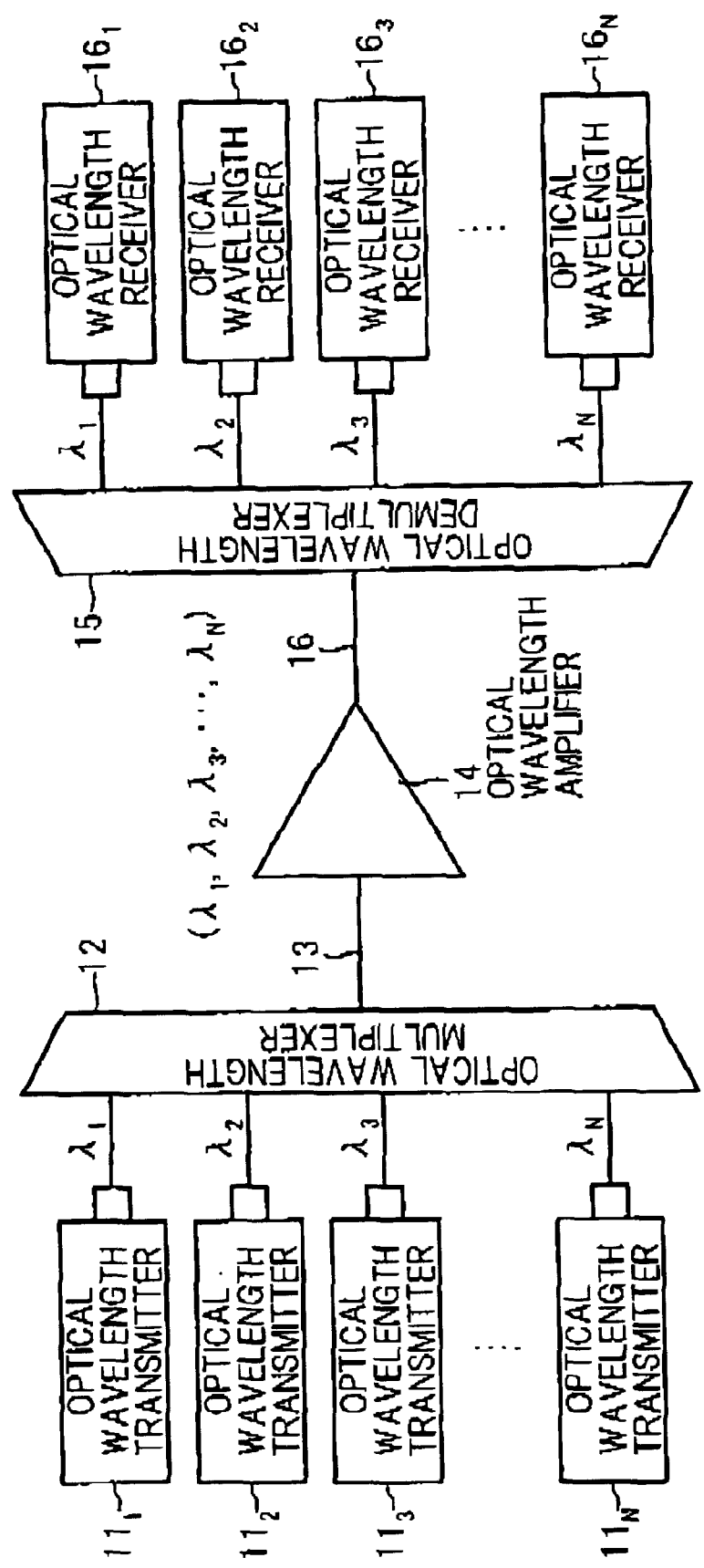
FIG. 1 is a schematic block diagram showing the conventional point-to-point wavelength multiplexing transmission system.
Figure 2:
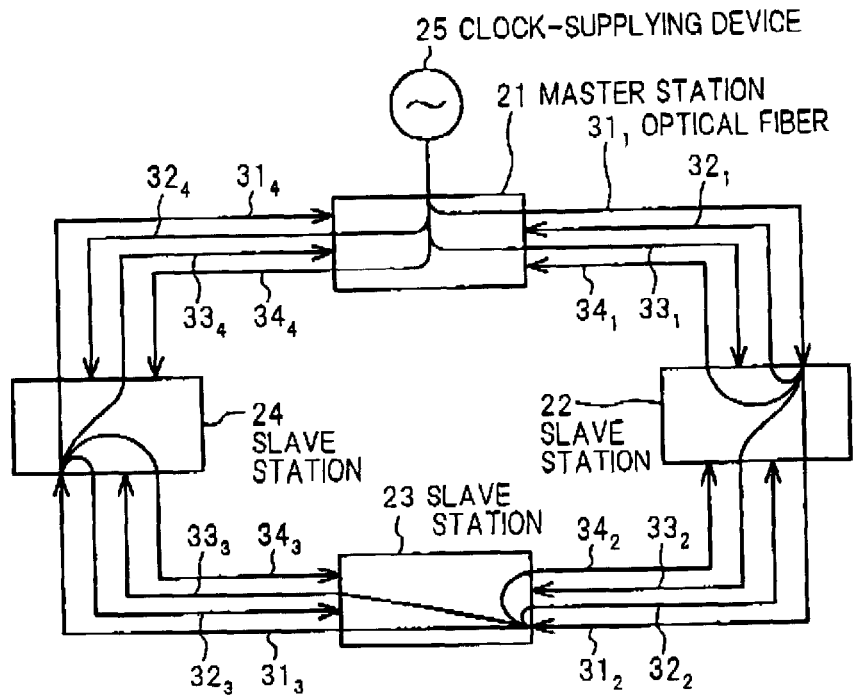
FIG. 2 is a network diagram showing a case that no failure occurs in the conventional optical ring system.
Figure 3:
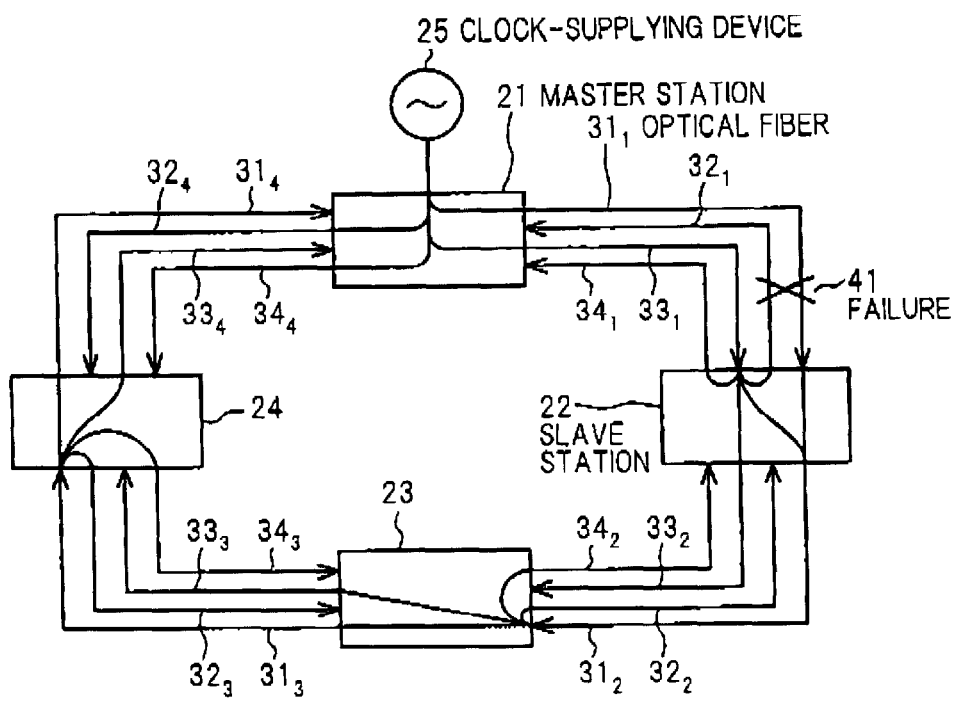
FIG. 3 is a network diagram showing a case that a failure occurs on the work line between the master station and the first slave station in the conventional system in FIG. 2.
Figure 4:
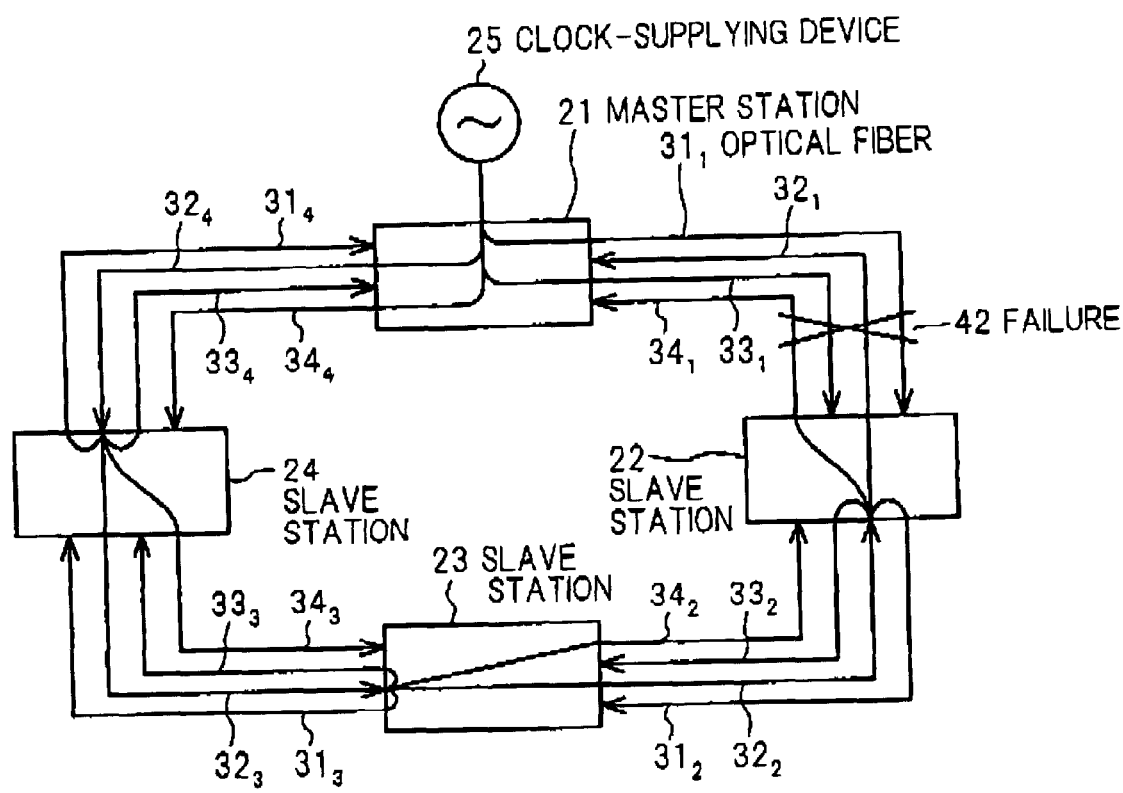
FIG. 4 is a network diagram showing a case that a failure occurs not only on the work line but also on the protection line between the master station and the first slave station in the conventional system in FIG. 2.
Figure 5:
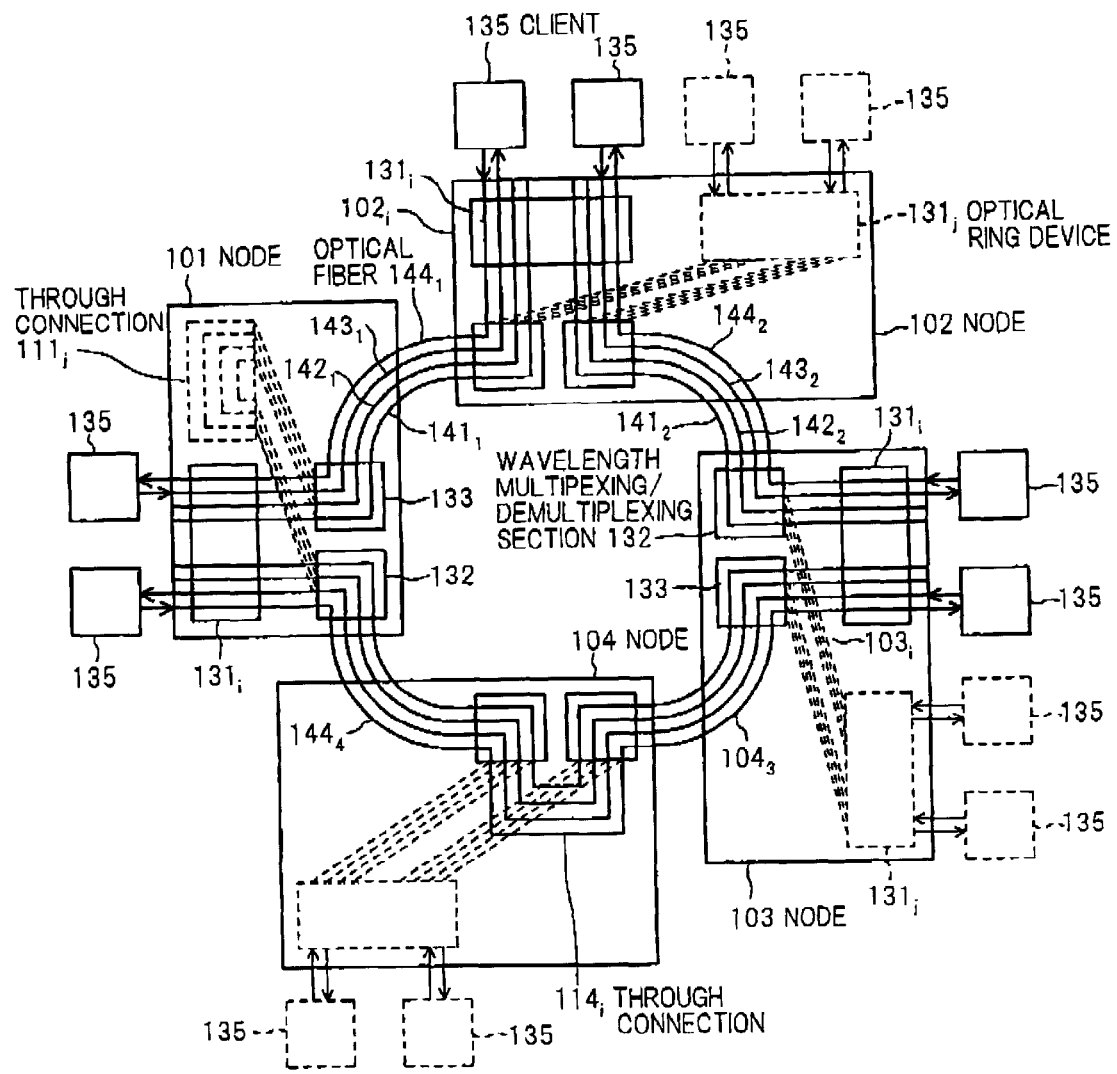
FIG. 5 is a network diagram showing the schematic composition of an optical ring system in a first preferred embodiment according to the invention.

FIG. 5 shows a schematic diagram showing the whole composition of an optical ring system in the first preferred embodiment according to the invention. In this example, for simplification of illustration, only the system composition concerning two representative wavelengths $\lambda_i$ and $\lambda_j$ is shown.

The optical ring system in this embodiment comprises first to fourth nodes 101, 102, 103 and 104. In the first to fourth nodes 101, 102, 103 and 104, wavelength multiplexing/demultiplexing sections 132, 133 to multiplex/demultiplex wavelength of optical signal are disposed. In the first to third nodes 101, 102 and 103, an optical ring device 131$_i$ for wavelength $\lambda_i$ is disposed. Also, as shown by dotted lines in FIG. 5, in the second to fourth nodes 102, 103 and 104, an optical ring device 131$_j$ for wavelength $\lambda_j$ is disposed. To the optical ring system, clients 135 are connected. The clients 135 is, for example, SDH (synchronous digital hierarchy)/SONET (synchronous optical network) device, IP router and ATM device. The client devices can communicate with each other through the optical ring system. There are some cases that it is not necessary to connect the client 135 to the system. In node 104, for wavelength $\lambda_i$, signal can be made to pass through by connecting between the wavelength multiplexing/demultiplexing sections 132, 133 by through connection 114$_i$. Similarly, in node 101, for wavelength $\lambda_j$, signal can be made to pass through by connecting between the wavelength multiplexing/demultiplexing sections 132, 133 by through connection 114$_j$.

Node 104 is a node that yields a transmission line to make wavelength $\lambda_i$ pass through, and is not provided with the optical ring device 131 and client 135 connected therewith. Node 101 yields a transmission line to make wavelength $\lambda_j$ pass through.

Considering independently each wavelength, the optical ring system in this embodiment is thus provided with four nodes, and the four optical fibers 141 to 144 are connected therebetween in the form of a ring. Namely, the optical ring system in this embodiment is composed of four-fiber ring. Of the four fibers, two optical fibers 141, 142 compose work line, i.e. actually-working line, and the remaining two optical fibers 143, 144 compose protection line, i.e. backup line. Each of these optical fibers 141 to 144 is not provided for each wavelength, but provided for wavelength-multiplexed optical signal.

Figure 6:
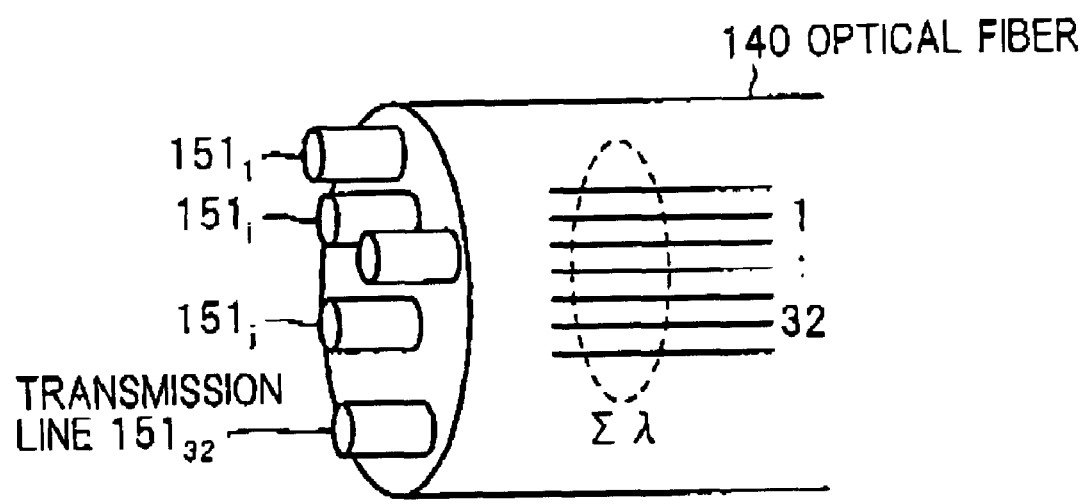
FIG. 6 is an illustration showing the concept of wavelength multiplexing.

FIG. 6 illustrates the concept of wavelength multiplexing. Herein, one optical fiber is represented as optical fiber 140. The optical fiber 140 in this embodiment can be regarded as the assembling ($\Sigma\lambda$) of, in total, 32 transmission lines from transmission line 151$_1$ for first wavelength $\lambda_1$ to transmission line 151$_{32}$ for 32$^{nd}$ wavelength $\lambda_{32}$. In this embodiment, a ring structure is given to each wavelength. This can be understood as if there exist 32 ring structures up and down and four optical fibers 141 to 144 wavelength-multiplexed are connected to connect 32 optical ring systems, respectively, up an down. In this embodiment, numerical value "32" is used replaced by "N" in explanations below.

Figure 7:
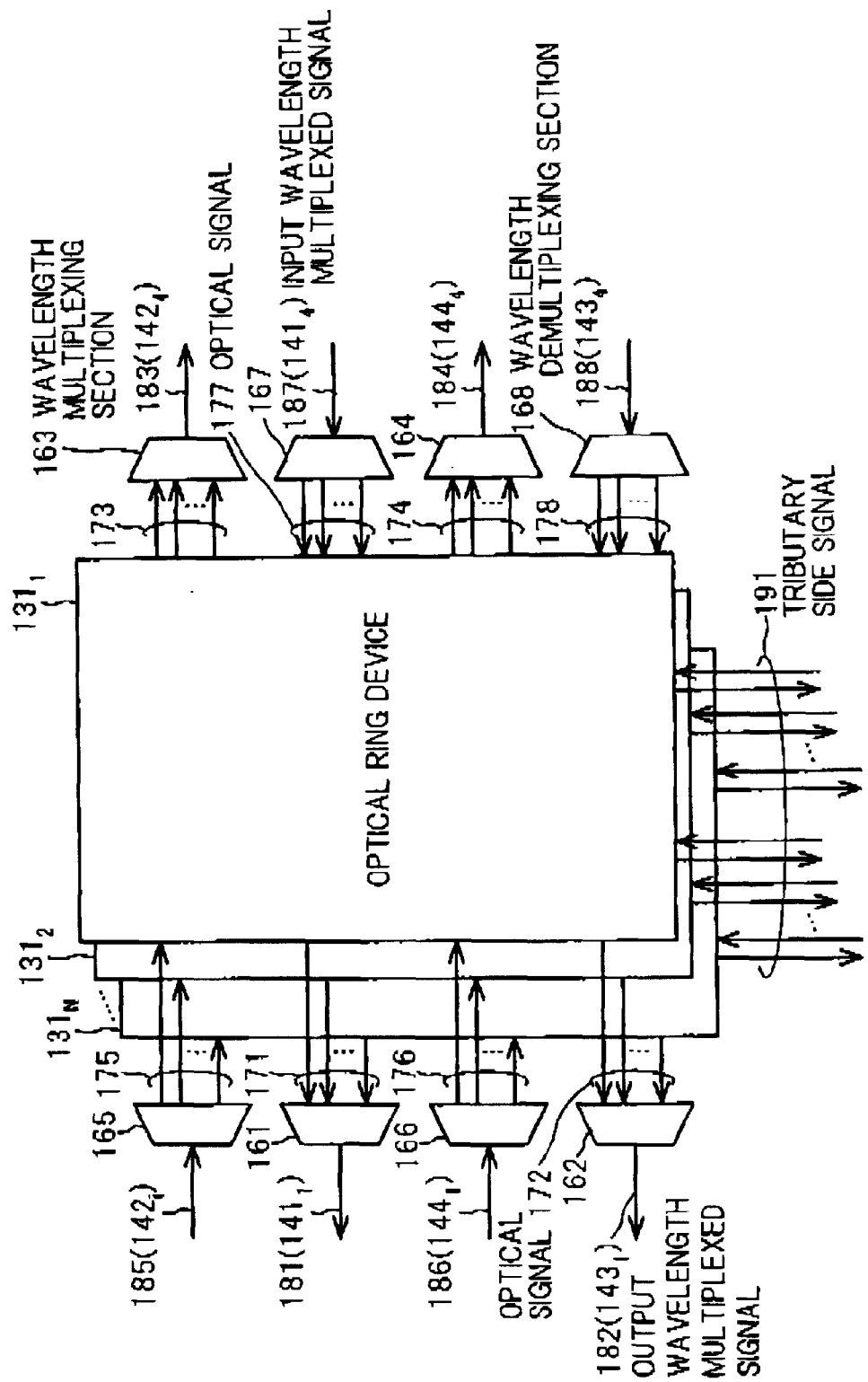
FIG. 7 is a block diagram showing the composition of one node connected with four optical fibers to compose the optical ring system in the first embodiment.

FIG. 7 shows the composition of one node connected with four optical fibers to compose the optical ring system in FIG. 5. The other nodes are also composed similarly. One node is provided with from optical ring device 131$_1$ for first wavelength $\lambda_1$ to optical ring device 131$_N$ for N-th wavelength $\lambda_N$ that are disposed corresponding to first wavelength $\lambda_1$ to N-th (32nd) wavelength $\lambda_N$. Here, for simplification of explanation, it is assumed that the composition to pass through a specific wavelength like connection 111$_j$ in FIG. 5 is not employed and the optical ring device 131 is provided to all the wavelengths.

In the node, four wavelength multiplexing sections 161 to 164 and four wavelength demultiplexing sections 165 to 168 are disposed corresponding to the four optical fibers 141 to 144. In operation, the first wavelength multiplexing section 161 multiplexes optical signals 171 with multiple wavelengths output from the optical ring device 131$_1$ for first wavelength $\lambda_1$ to the optical ring device 131$_N$ for N-th wavelength $\lambda_N$, and then outputs output wavelength multiplexed signal 181. This output wavelength multiplexed signal 181 is sent out to the optical fiber 141$_1$ as work line in FIG. 5.

In like manner, the second wavelength multiplexing section 162 multiplexes optical signals 172 with multiple wavelengths output from the optical ring device $131_1$ for first wavelength $\lambda_1$ to the optical ring device $131_N$ for N-th wavelength $\lambda_N$, and then outputs output wavelength multiplexed signal 182. This output wavelength multiplexed signal 182 is sent out to the optical fiber $143_1$ as protection line in FIG. 5.

The third wavelength multiplexing section 163 is disposed on the opposite side of the first and second wavelength multiplexing sections 161, 162 in the first to N-th optical ring device $131_1$ to $131_N$. In operation, the third wavelength multiplexing section 163 multiplexes optical signals 173 with multiple wavelengths output from the optical ring device $131_1$ for first wavelength $\lambda_1$ to the optical ring device $131_N$ for N-th wavelength $\lambda_N$, and then outputs output wavelength multiplexed signal 183. This output wavelength multiplexed signal 183 is sent out to the optical fiber $142_4$ as work line in FIG. 5, which is in the direction reverse to output wavelength multiplexed signal 181.

Also, the fourth wavelength multiplexing section 164 is disposed on the opposite side of the first and second wavelength multiplexing sections 161, 162 in the first to N-th optical ring device $131_1$ to $131_N$. In operation, the fourth wavelength multiplexing section 164 multiplexes optical signals 174 with multiple wavelengths output from the optical ring device $131_1$ for first wavelength $\lambda_1$ to the optical ring device $131_N$ for N-th wavelength $\lambda_N$, and then outputs output wavelength multiplexed signal 184. This output wavelength multiplexed signal 184 is sent out to the optical fiber $144_4$ as protection line in FIG. 5, which is in the same direction as output wavelength multiplexed signal 183.

On the other hand, the first wavelength demultiplexing section 165 receives input wavelength multiplexed signal 185 from optical fiber $142_1$ as work line in FIG. 5, demultiplexing the input wavelength multiplexed signal 185 into optical signals 175 with the respective multiple wavelengths, then inputting them to the corresponding optical ring devices $131_1$ to $131_N$ for first wavelength $\lambda_1$ to N-th wavelength $\lambda_N$.

Also, the second wavelength demultiplexing section 166 receives input wavelength multiplexed signal 186 from optical fiber $144_1$ as protection line in FIG. 5, demultiplexing the input wavelength multiplexed signal 186 into optical signals 176 with the respective multiple wavelengths, then inputting them to the corresponding optical ring devices $131_1$ to $131_N$ for first wavelength $\lambda_1$ to N-th wavelength $\lambda_N$.

The third wavelength demultiplexing section 167 is disposed on the opposite side of the first and second wavelength demultiplexing sections 165, 166. It receives input wavelength multiplexed signal 187 from optical fiber $141_4$ as work line in FIG. 5, demultiplexing the input wavelength multiplexed signal 187 into optical signals 177 with the respective multiple wavelengths, then inputting them to the corresponding optical ring devices $131_1$ to $131_N$ for first wavelength $\lambda_1$ to N-th wavelength $\lambda_N$.

The fourth wavelength demultiplexing section 168 is disposed on the same side as the third wavelength demultiplexing section 167. It receives input wavelength multiplexed signal 188 from optical fiber $143_4$ as protection line in FIG. 5, demultiplexing the input wavelength multiplexed signal 188 into optical signals 178 with the respective multiple wavelengths, then inputting them to the corresponding optical ring devices $131_1$ to $131_N$ for first wavelength $\lambda_1$ to N-th wavelength $\lambda_N$.

Tributary side signals 191 are input/output between the SDH/SONET devices 135 in FIG. 5 and the corresponding optical ring devices $131_1$ to $131_N$ for first wavelength $\lambda_1$ to N-th wavelength $\lambda_N$. The optical ring devices $131_1$ to $131_N$ input/output tributary side signal 191 to the west or east. Herein, west means the left direction in the drawing and east means the right direction in the drawing.

Figure 8:
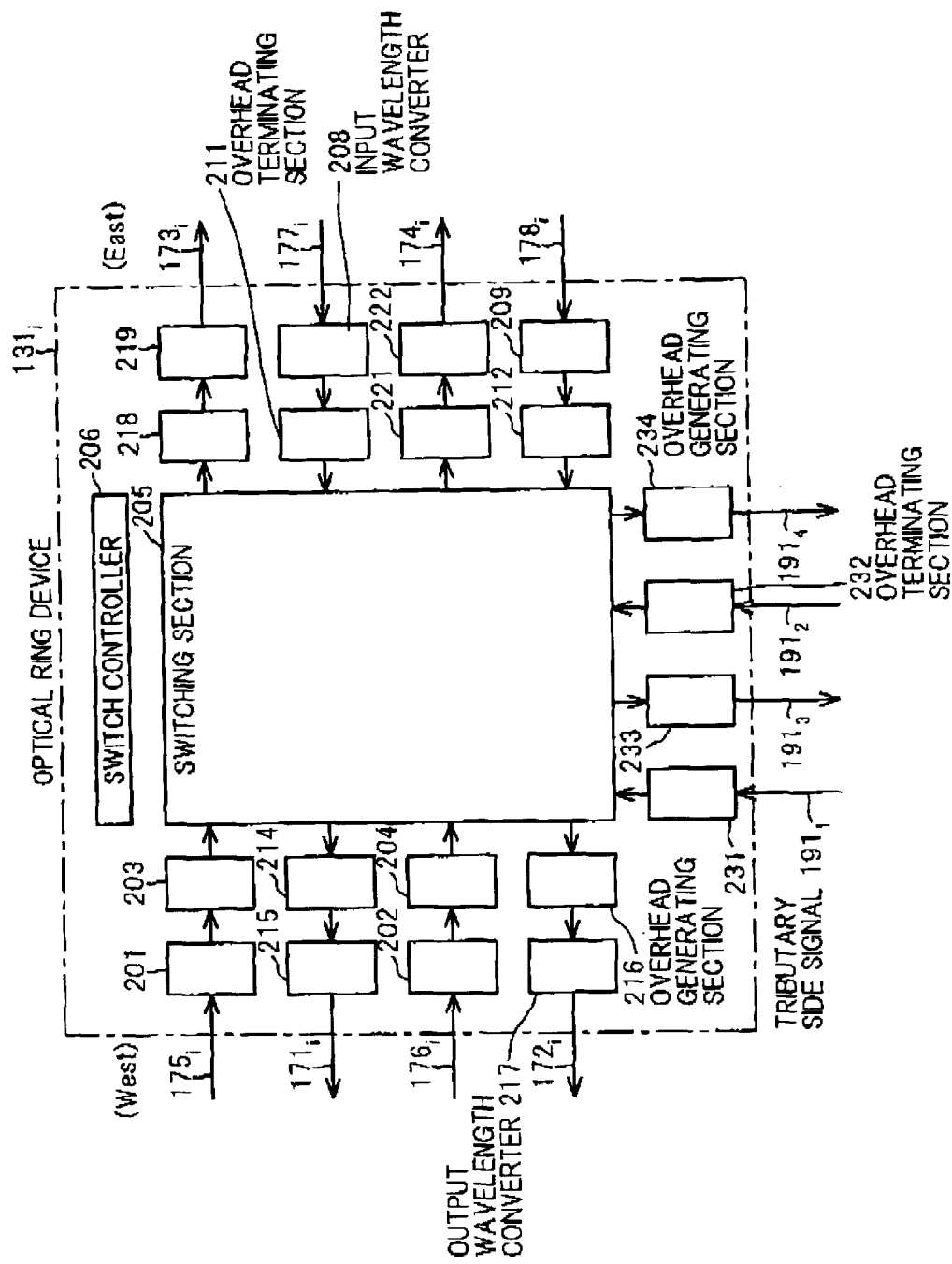
FIG. 8 is a block diagram showing the detailed composition of an optical ring device in the first embodiment.

FIG. 8 shows the detailed composition of optical ring device 131 in FIG. 7. As shown in FIG. 7, the optical ring device 131 is provided to each wavelength in each node. In FIG. 8, for example, optical ring device $131_1$ to wavelength $\lambda_i$ is explained below.

From the west side of the optical ring device $131_i$, optical signal $175_i$ to wavelength $\lambda_i$ demultiplexed by the first wavelength demultiplexing section 165 in FIG. 7 and optical signal $176_i$ to wavelength $\lambda_i$ demultiplexed by the second wavelength demultiplexing section 166 in FIG. 7 are input thereto. These signals are wavelength-converted by corresponding input wavelength converters 201, 202, then overhead-terminated by corresponding overhead terminating sections 203, 204. Thus, they are input to a switching section 205 while their overhead is removed. The overhead information stored into the overhead is given away to a switch controller 206 to control the switching section 205.

From the east side of the optical ring device $131_i$, optical signal $177_i$ to wavelength $\lambda_i$ demultiplexed by the third wavelength demultiplexing section 167 in FIG. 7 and optical signal $178_i$ to wavelength $\lambda_i$ demultiplexed by the fourth wavelength demultiplexing section 168 in FIG. 7 are input thereto. These signals are wavelength-converted by corresponding input wavelength converters 208, 209, then overhead-terminated by corresponding overhead terminating sections 211, 212. Thus, they are input to the switching section 205 while their overhead is removed. The over head information stored into the overhead is given away to the switch controller 206 to control the switching section 205.

On the other hand, optical signal $171_i$ to be output to the west side is first output from the switching section 205, then input to an overhead generator 214, where the overhead information sent from the switch controller 206 is, as an overhead, added to the signal. Then, it is input to an output wavelength converter 215, and is then output as the optical signal $171_i$ to wavelength $\lambda_i$.

In like manner, optical signal $172_i$ to be output to the west side is first output from the switching section 205, then input to an overhead generator 216, where the overhead information sent from the switch controller 206 is, as an overhead, added to the signal. Then, it is input to an output wavelength converter 217, and is then output as the optical signal $172_i$ to wavelength $\lambda_i$.

The same applies to the east side. Namely, optical signal $173_i$ to be output to the east side is first output from the switching section 205, then input to an overhead generator 218, where the overhead information sent from the switch controller 206 is, as an overhead, added to the signal. Then, it is input to an output wavelength converter 219, and then is output as the optical signal $173_i$ to wavelength $\lambda_i$. Also, optical signal $174_i$ to be output to the east side is first output from the switching section 205, then input to an overhead generator 221, where the overhead information sent from the switch controller 206 is, as an overhead, added to the signal. Then, it is input to an output wavelength converter 222, and is then output as the optical signal $174_i$ to wavelength $\lambda_i$.

Thus, the optical ring device $131_i$ is provided with the input and output wavelength converters 201, 202, 215, 217, 208, 209, 219 and 222. Therefore, it can convert a demultiplexed wavelength input from corresponding one of four optical fibers 141 to 144 into arbitrary one and then input it to the switching section 205, and it can output converting the wavelength of optical signal output from the switching section 205 into arbitrary wavelength. Namely, optical signal can be input/output changing the wavelength of optical signal to coincide with a wavelength that is already used by an existing node. Also, by changing input wavelength range into further narrowed wavelength range, narrow-band light necessary for wavelength multiplexing can be obtained.

The switching section 205 is further connected with two overhead terminating sections 231, 232 and two overhead generating sections 233, 234. First and second tributary side signals $191_1$, $191_2$ are input to the overhead terminating sections 231 and 232, respectively. After incurring the overhead processing, they are input to the switching section 205. The processed overhead information is sent to the switch controller 206. Signals input from the switching section 205 to the overhead generating sections 233, 234 are provided with overheads based on the overhead information sent from the switch controller 206, and then are output as third and fourth tributary side signals $191_3$, $191_4$, respectively.

The protection operation in occurrence of failure etc. is conducted by the switch controller 206 to control the switching section 205. Namely, the switch controller 206 collects information of failure from the respective overhead terminating sections 203, 204, 211, 212, 231 and 232, and then, according to the content, switching the tributary side signal 191 and the west side or east side signal, it allows optical signal to be transmitted avoiding the position of failure. In this embodiment, the optical ring device 131 is provided to each wavelength. Therefore, the optical ring device 131 to each wavelength adds overhead information for conducting the switching control to the corresponding overhead generating sections 214, 216, 218, 221, 233 and 234. This allows the optical ring device 131 in the other node to conduct the switching control.

The control operation of the switch controller 206 in this optical ring system thus composed will be explained below, taking cases of normal state and failure.

[Switching Control In Normal State]

Figure 9:
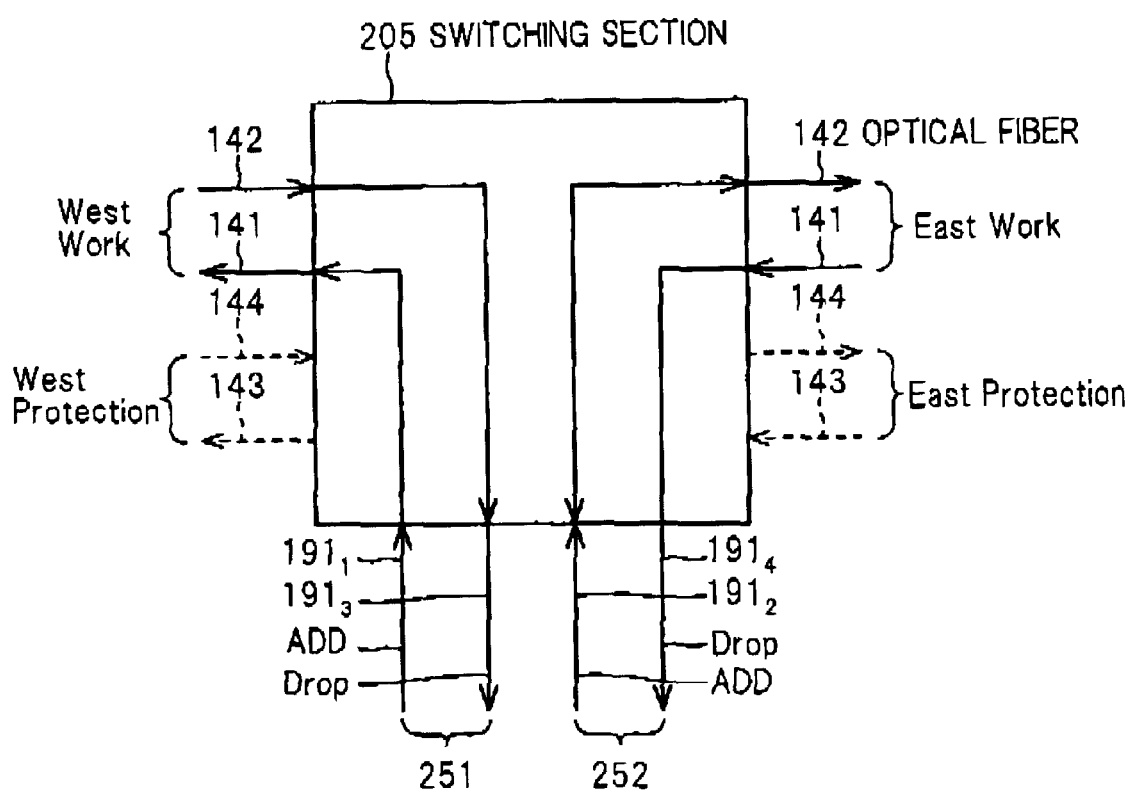
FIG. 9 is an illustration showing a connection pattern of a switching section in the first embodiment in normal state that no failure occurs.

FIG. 9 shows a connection pattern of the switching section 205 in normal state that no failure occurs. In this state, failure of wavelength to conduct the add/drop processing of signal line in the optical ring system is not detected. "add" means to set signal path in the optical ring system so that signal received on the tributary side is transmitted to the neighboring optical ring system. "drop" means to set signal path in the optical ring system so that signal received from the neighboring optical ring system is transmitted to the tributary side. In this state, where no failure is detected, a pair 251 of first and third tributary side signals $191_1$, $191_3$ is, as shown in FIG. 9, connected to the west-work side optical fibers 141, 142. Also, a pair 252 of second and fourth tributary side signals $191_2$, $191_4$ is connected to the east-work side optical fibers 141, 142.

In this connection pattern, for example, first tributary side signal $191_1$ is input to the switching section 205 after the overhead is removed by the overhead terminating section 231, then provided with an overhead by the overhead generating section 214, wavelength-converted by the output wavelength converter 215, multiplexed by the wavelength multiplexing section 161, output to the optical fiber 141.

The two west-protection side optical fibers 143, 144 shown by dotted lines in FIG. 9 are not connected by the switching section 205. The same applies to the two east-protection side optical fibers 143, 144.

Although in FIG. 9 the switching section 205 at one node is shown, the ring protection is, as shown in FIG. 5, formed by disposing this at each node except the through node.

[Switching Control (example 1) In Failure]

Figure 10:
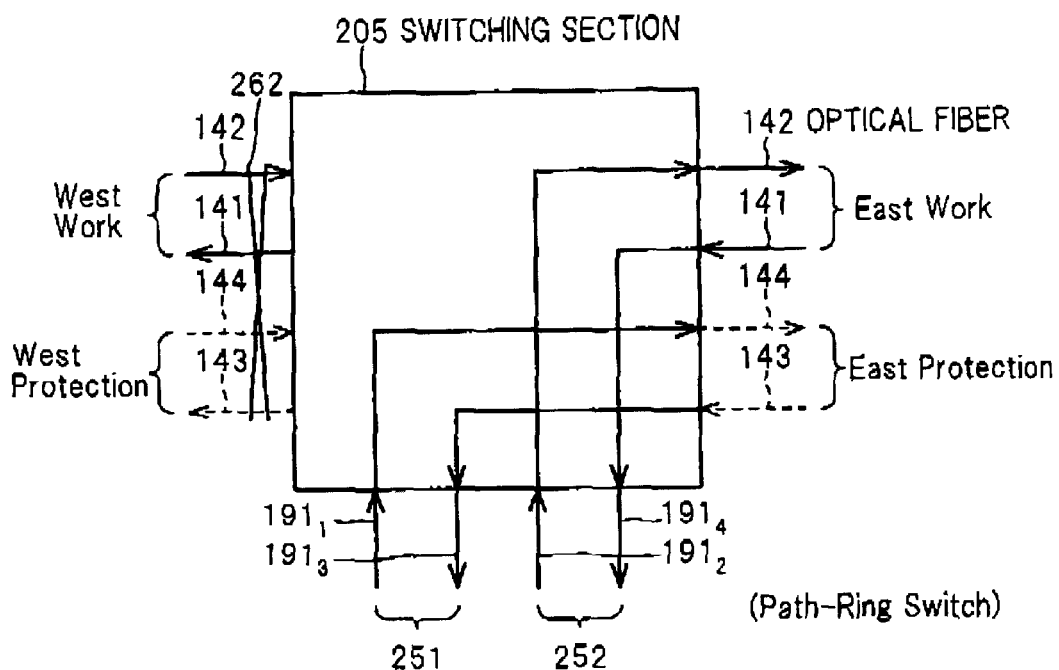
FIG. 10 is an illustration showing a first example of connection pattern of the switching section in the first embodiment in state that a failure in communication is detected.

FIG. 10 shows a first example of connection pattern of the switching section 205 in a case that a failure in communication is detected. In the first example, failure 261 occurs not only at the west-work side optical fibers 141, 142 but also at the west-protection side optical fibers 143, 144. The overhead terminating sections 203, 204 in FIG. 8 each are detecting the failure.

When the switch controller 206 in FIG. 8 receives overhead information to indicate the occurrence of communication failure on the west-work and west-protection sides, it controls the switching section 205 to have the connection pattern shown in FIG. 10. Namely, a pair 251 of first and third tributary side signals $191_1$, $191_3$ is connected switching from the west-work side optical fibers 141, 142 to the east-protection side optical fibers 143, 144. Then, the switch controller 206 sends this switching execution information to the overhead generating section 221 so as to write it into the overhead of optical signal 174 in FIG. 8.

In FIG. 10, shown is the case that the failure occurs on both the west-work side and the west-protection side. However, the same applies to a case that a failure occurs on both the east-work side and the east-protection side. Namely, in this case, a pair 252 of second and fourth tributary side signals $191_2$, $191_4$ is connected to the west-protection side optical fibers 143, 144 instead of being connected to the east-work side optical fibers 141, 142. Also in this case, the overhead terminating sections 211, 212 in FIG. 8 each are detecting the failure, the switch controller 206 conducts the switching control based on this detection. In response to this, the switching section 205 conducts the above switching. Also in this case, the switch controller 206 sends this switching execution information to the overhead generating section 216 so as to write it into the overhead of optical signal 172 in FIG. 8. This operation is called path-ring switch mode, where the recovery from failure can be made by switching signal to the direction opposite to the side that the failure is detected.

[Switching Control (example 2) In Failure]

Figure 11:
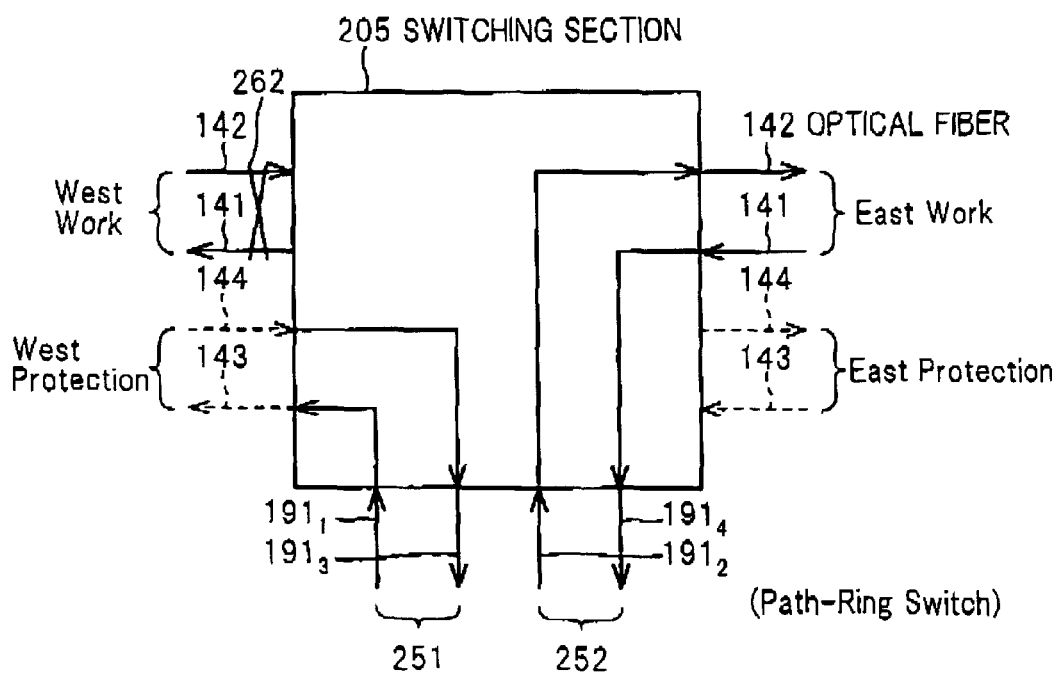
FIG. 11 is an illustration showing a second example of connection pattern of the switching section in the first embodiment in state that a failure in communication is detected.

FIG. 11 shows a second example of connection pattern of the switching section 205 in a case that a failure in communication is detected. In the second example, failure 262 occurs only at the west-work side optical fibers 141, 142. The overhead terminating section 203 in FIG. 8 is detecting the failure.

When the switch controller 206 in FIG. 8 receives overhead information to indicate the occurrence of communication failure on the west-work side, it controls the switching section 205 to have the connection pattern shown in FIG. 11. Namely, a pair 251 of first and third tributary side signals $191_1$, $191_3$ is connected switching to the west-protection side optical fibers 143, 144. Then, the switch controller 206 sends this switching execution information to the overhead generating section 216 so as to write it into the overhead of optical signal 172 in FIG. 8.

In FIG. 11, shown is the case that the failure occurs on the west-work side. However, the same applies to a case that a failure occurs on the east-work side. Namely, in this case, a pair 252 of second and fourth tributary side signals $191_2$, $191_4$ is connected to the east-protection side optical fibers 143, 144. Also in this case, the overhead terminating section 211 in FIG. 8 is detecting the failure, the switch controller 206 conducts the switching control based on this detection. In response to this, the switching section 205 conducts the above switching. Also in this case, the switch controller 206 sends this switching execution information to the overhead generating section 221 so as to write it into the overhead of optical signal 174 in FIG. 8. This operation is called path-span switch mode, where the recovery from failure can be made by switching signal to the protection side in the same direction as the work side that the failure is detected. Here, the protection side in the same direction means that it is switched to the west-protection side, for example, when a failure occurs on the west-work side.

Figure 12:
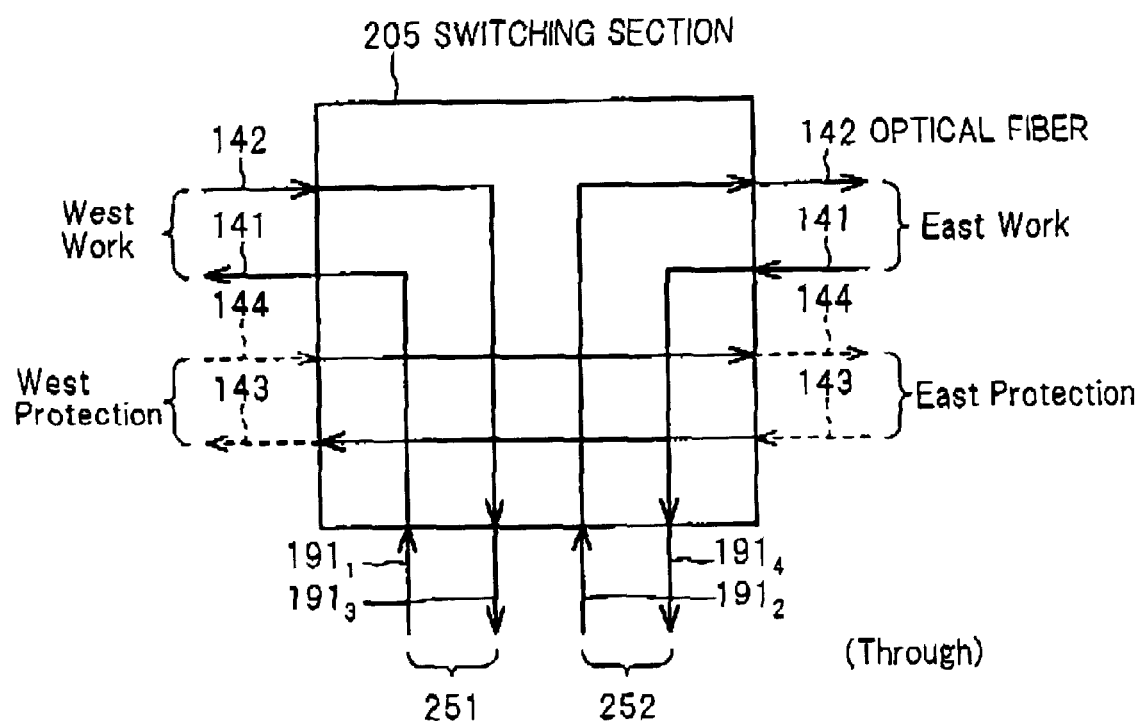
FIG. 12 is an illustration showing a connection pattern of the switching section of a through node in the first embodiment.

FIG. 12 shows a connection pattern of the switching section 205 in a through node. In FIG. 5, as described earlier, in the through node 104 to wavelength $\lambda_i$ and the through node 101 to wavelength $\lambda_j$, in fact, the switching section 205 does not conduct the switching operation. In the through state, the switching section 205 connects a pair 251 of first and third tributary side signals $191_1$, $191_3$ to the west-work side optical fibers 141, 142. Also, a pair 252 of second and fourth tributary side signals $191_2$, $191_4$ is connected to the east-work side optical fibers 141, 142. Further, the two west-protection side optical fibers 143, 144 are directly connected to the corresponding two east-protection side optical fibers 143, 144.

Therefore, such a connection control may be fixedly conducted by the switch controller 206 of optical ring device 131 in the through node, or by using only optical fibers without using any optical ring device 131.

Second Embodiment

Meanwhile, in wavelength multiplexing network, a failure such as disconnection of optical fiber and malfunction of optical transmitter/receiver may occur. To cope with this, the protection function, as a failure-recovering means, explained in FIGS. 10 and 11 in the first embodiment is necessary for the optical ring system or optical ring network. An optical ring network equipped with the protection function can have a BWPSR (bidirectional wavelength switched ring) system. Point to detect a failure is a node to terminate a wavelength path. Therefore, failure can be detected by an optical ring device disposed in the optical ring network.

In BWPSR system, unit for switching of signal is literally a wavelength path. So, protection wavelengths are, in advance, provided to form a protection wavelength path to be used when a failure occurs in ring network, and are shared between multiple work wavelength paths. Such an optical ring network can be composed not only by four fibers but also by two fibers. For example, explanation below is given to a four-fiber ring.

Figure 13:
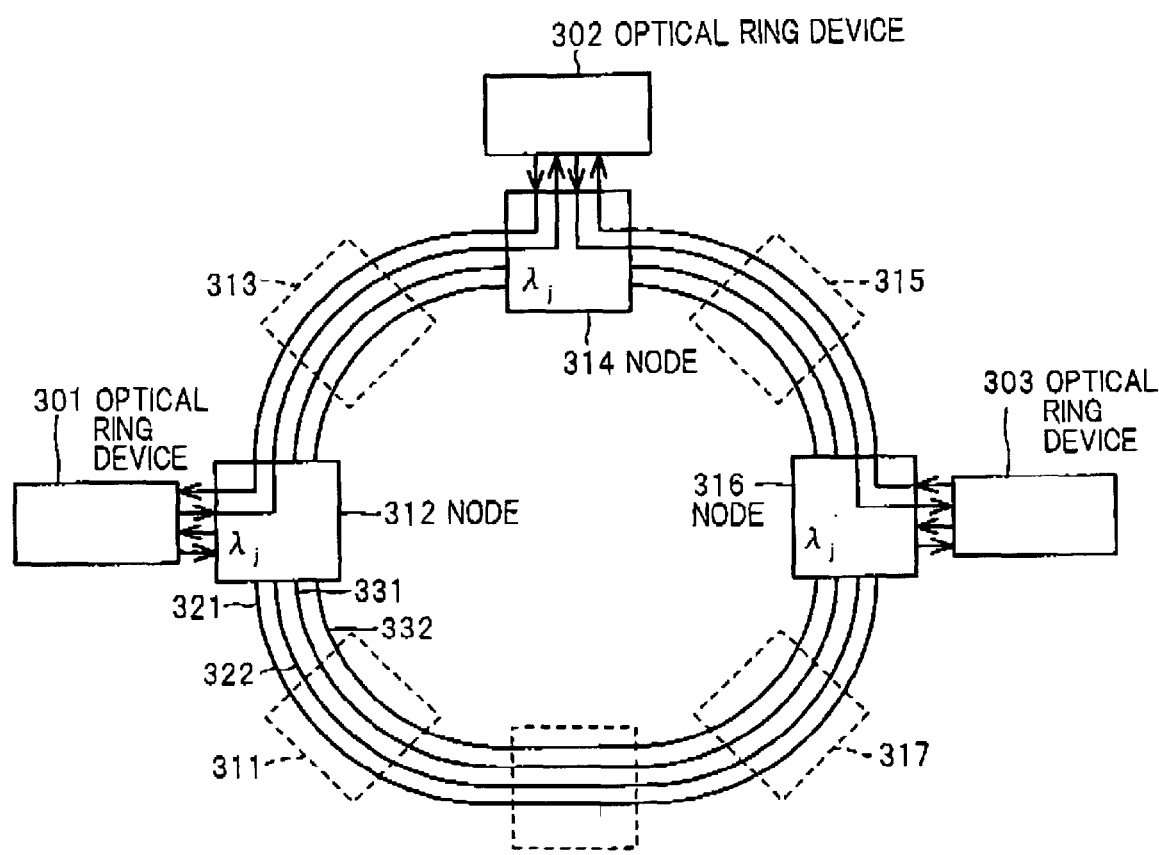
FIG. 13 is a network diagram illustrating a four-fiber ring network for specific wavelength $\lambda_j$ to which the BWPSR system is applied, in a second preferred embodiment according to the invention.

FIG. 13 illustrates a four-fiber ring network for specific wavelength $\lambda_j$ to which the BWPSR system is applied. This network is composed of first to third optical ring devices 301 to 303, a first work-line fiber 321 and a first protection-line fiber 331 to be used for the clockwise data transfer among multiple nodes 311, 312, 313, . . . , and a second work-line fiber 322 and a second protection-line fiber 332 to be used for the counterclockwise data transfer among multiple nodes 311, 312, 313, . . . .

In the four-fiber ring BWPSR system, when a failure occurs, a node to each wavelength that terminates a work path where the failure occurs switches the path into a protection path, thereby the recovery from failure is conducted in unit of wavelength path. For example, in FIG. 13, concerned one of nodes 312, 314 and 316 to handle wavelength $\lambda_i$ conducts the switching to protection path.

Thus, when one fiber in four-fiber ring where two wavelengths $\lambda_i$ and $\lambda_j$ are multiplexed as in the first embodiment in FIG. 5 incurs a failure, optical rings for wavelength $\lambda_i$ and wavelength $\lambda_j$ each conduct the recovery from failure.

Figure 14:
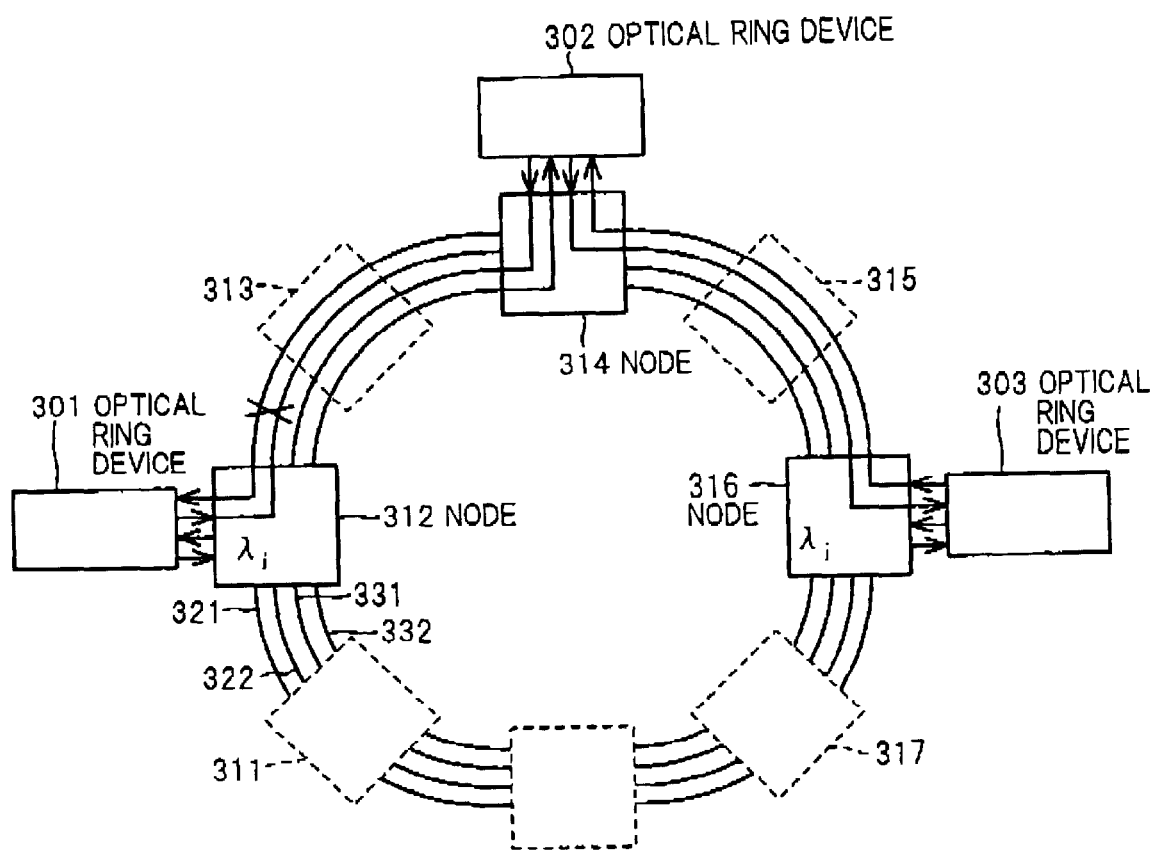
FIG. 14 is a network diagram illustrating a case that, in the second embodiment, first and second work-line fibers incur a failure between a second node and a third node.

FIG. 14 shows a case that in the second embodiment the first and second work-line fibers incur a failure between the second node and the third node. In FIG. 14, like the case in FIG. 13, there is also provided a four-fiber ring network to specific wavelength $\lambda_j$. In FIG. 14, like parts are indicated like reference numerals used in FIG. 13 and their explanations are omitted herein. The failure on the first work-line fiber 321 is detected by the second node 312 that terminates the wavelength path. Also, the failure on the second work-line fiber 322 is detected by the fourth node 314 that terminates the wavelength path since the data transfer is conducted counterclockwise.

In this example, the failure occurs only on the first and second work-line fibers 321, 322. Therefore, nodes 312, 314 to terminate the work path extending through the failure position come into the path-span switch mode, where the protection path is set in the same direction as the work path to recover the failure. Thus, when failure occurs only on the work path through the work line, it operates as a path-span switch to switch into the same direction as the path being set.

Figure 15:
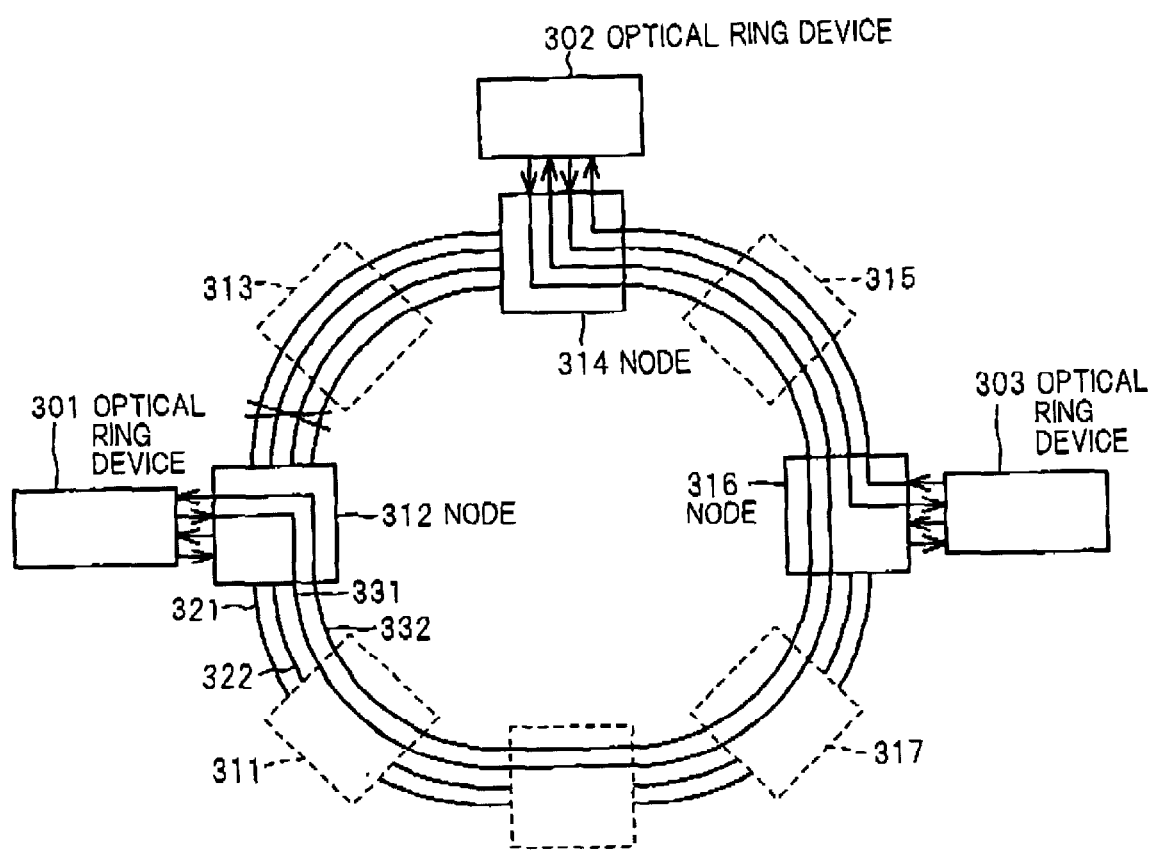
FIG. 15 is a network diagram illustrating a case that, in the second embodiment, all fibers incur a failure between the second node and third node.

In contrast, FIG. 15 illustrates a case that not only the first and second work-line fibers but also the protection-line fibers incur a failure between the second node and third node. In FIG. 15, like the case in FIGS. 13 and 14, there is also provided a four-fiber ring network to specific wavelength $\lambda_j$. In FIG. 15, like parts are indicated like reference numerals used in FIG. 13 and their explanations are omitted herein.

Thus, when all fibers 321, 322, 331 and 332 incur a failure between the second and third nodes, the second and third nodes 312, 314 to terminate the work path extending through the failure position detect the failure and come into the path-ring switch mode, where the protection path is set in the direction opposite to the work path to recover the failure.

Although in FIGS. 14 and 15 the recovery from failure is explained about specific wavelength $\lambda_j$, such recovery can be independently conducted to each wavelength in optical ring devices (which are, in FIGS. 13 to 15, shown only to wavelength $\lambda_j$) that are disposed to each wavelength. Also, when all fibers are interrupted at a specific section, i.e., when the work line and protection line are interrupted to all wavelengths, it operates as a path-ring switch to switch into the direction opposite to the work path being set.

Third Embodiment

Figure 16A:
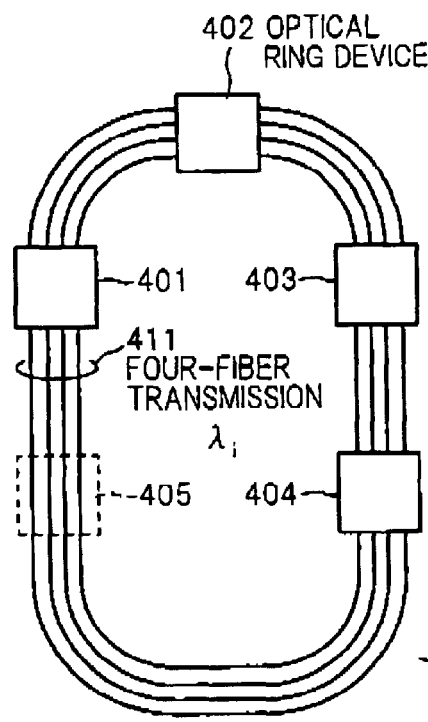
FIG. 16 is a network diagram illustrating two ring networks with different routes combined, in a third preferred embodiment according to the invention.
Figure 16B:
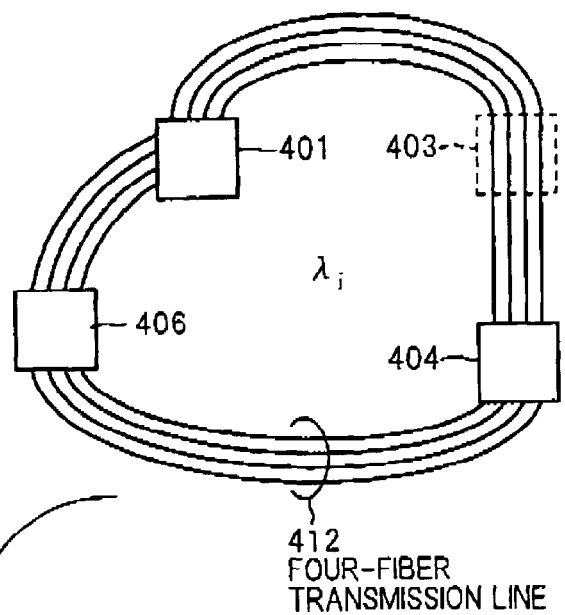
Figure 16C:
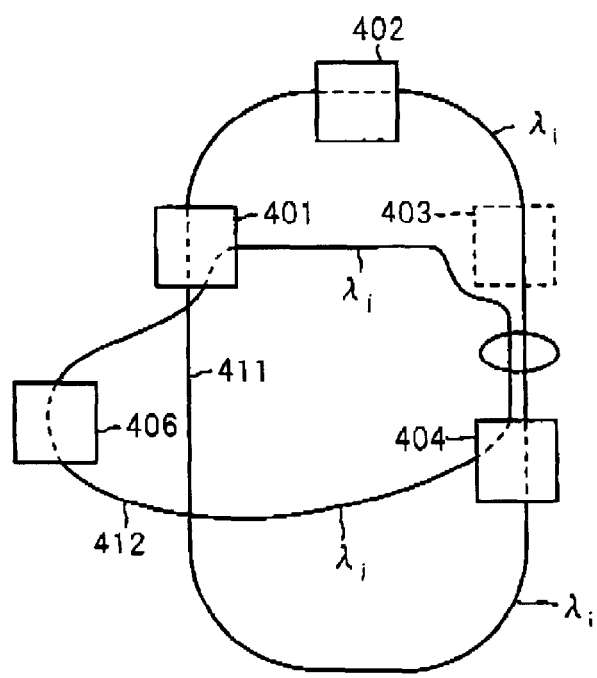

FIG. 16 illustrates a case that two ring networks with different routes are combined. As explained in the first embodiment in FIG. 8. when provided with dedicated optical ring devices 131 that have wavelength converter section such as input wavelength converters 201, 202 and output wavelength converters 215, 217, the multiplexing of ring can be realized by combining multiple networks with different wavelengths.

In FIG. 16, (*a*) shows a first ring network using wavelength $\lambda_i$. The first ring network is formed connecting first to fifth optical ring device 401 to 405 by four-fiber transmission line 411 for wavelength $\lambda_i$. Here, the four-fiber transmission line 411 means collectively transmission lines with wavelength $\lambda_i$ in four optical fibers 141 to 144 in FIG. 5.

On the other hand, FIG. 16(*b*) shows a second ring network using wavelength $\lambda_j$. The second ring network is formed connecting first, third, fourth and sixth optical ring devices 401, 403, 404 and 406 by four-fiber transmission line 412 for wavelength $\lambda_j$. Here, the four-fiber transmission line 412 means collectively transmission lines with wavelength $\lambda_j$ in four optical fibers 141 to 144 in FIG. 5.

FIG. 16(*c*) illustrates a configuration that the first and second ring networks are combined each other. By this combination, two wavelengths $\lambda_i$, $\lambda_j$ make an entry into the first, third and fourth optical ring devices 401, 403 and 404. However, the different wavelengths can be accommodated by the wavelength conversion to use the input wavelength converter and output wavelength converter provided for each wavelength.

Figure 17:
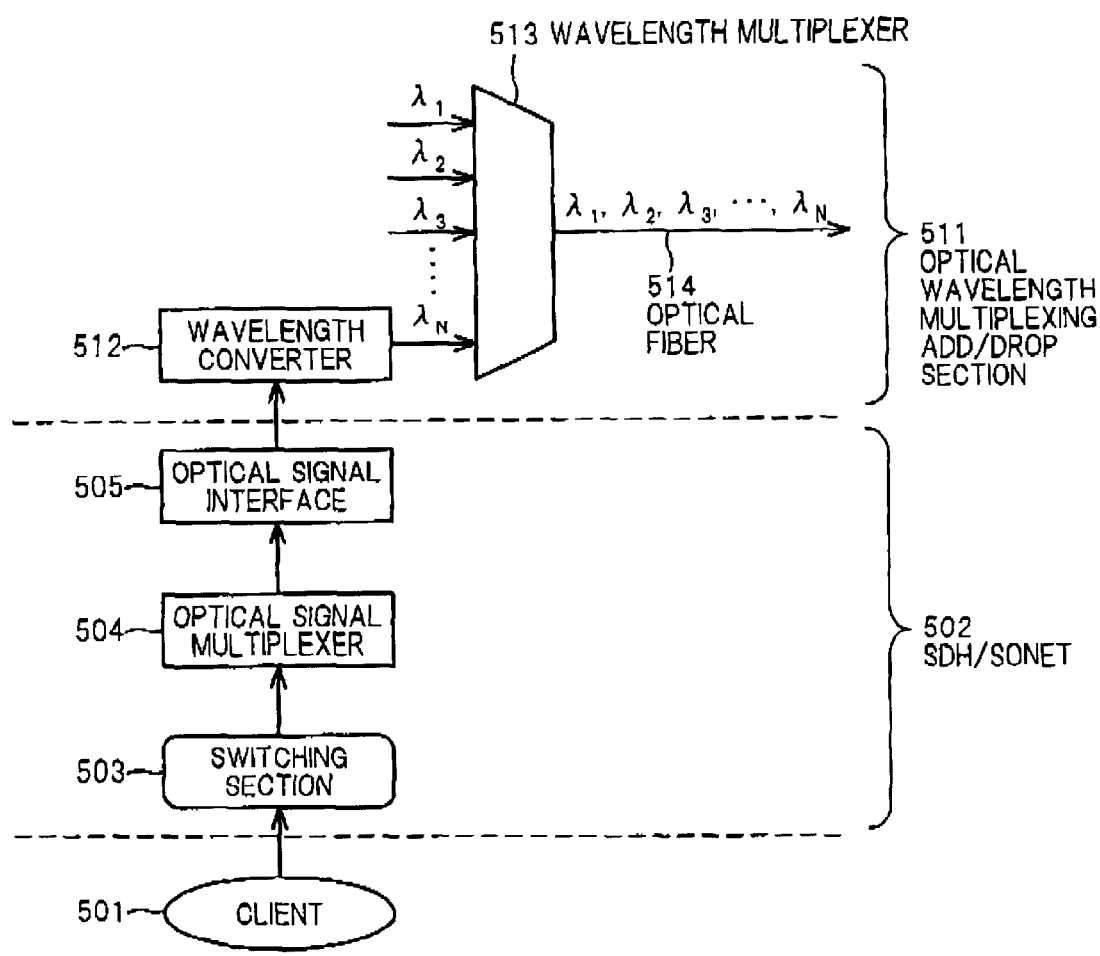
FIG. 17 is a block diagram showing a conventional operation that optical signal from each client is wavelength-multiplexed and then output to the optical fiber.
Figure 18:
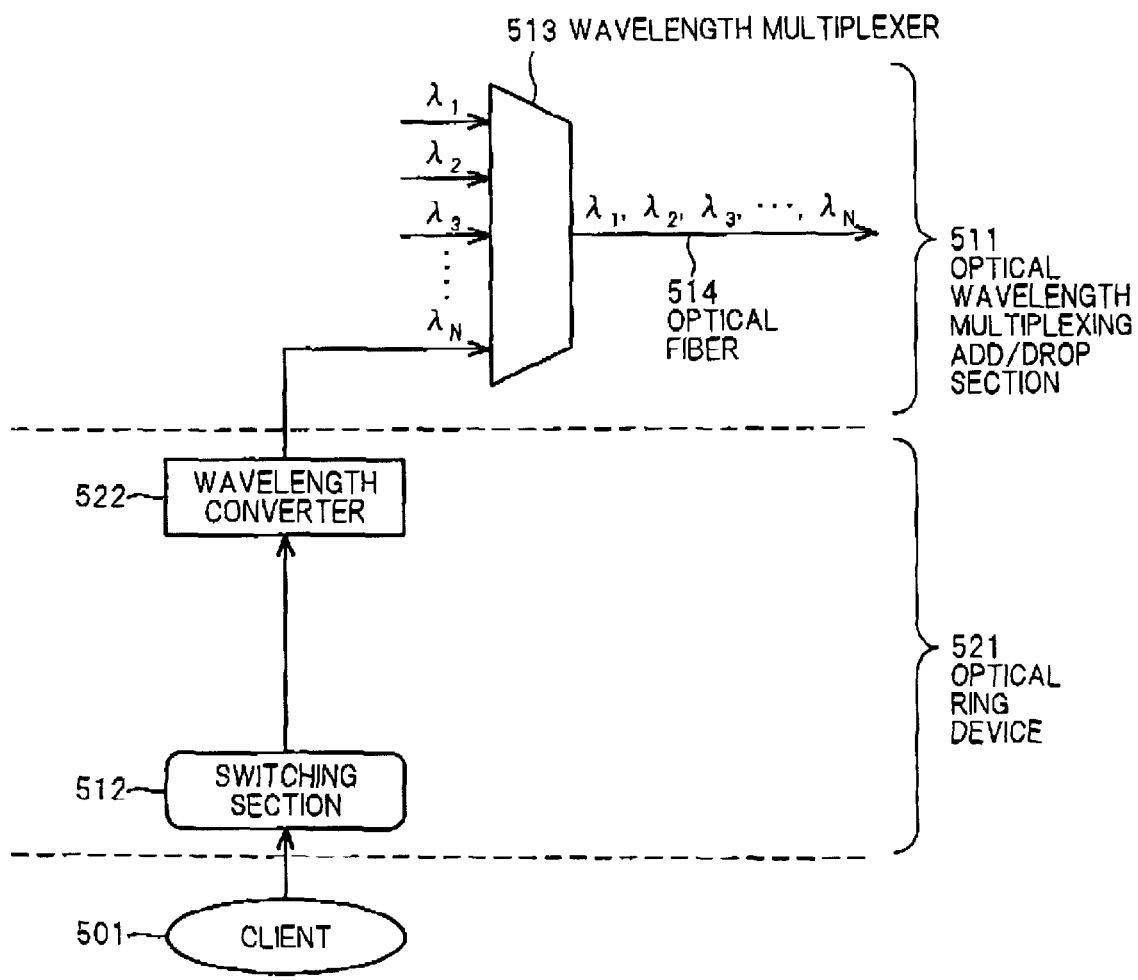
FIG. 18 is a block diagram showing an operation that, due to wavelength converter disposed in the optical ring device, optical signal from each client is wavelength-converted without being multiplexed on time axis, in the first to third embodiments of the invention.

FIGS. 17 and 18 illustrate the merit of an output wavelength converter, as an example, to be disposed in the optical ring device. Meanwhile, FIG. 17 shows a conventional operation that optical signal from each client is wavelength-multiplexed and then output to the optical fiber. In the conventional operation, output data obtained from client 501 is selected by a switch 503 in a SDH/SONET device (see FIG. 5) 502, multiplexed on time axis by an optical signal multiplexer 504, passing through an optical signal interface 505, converted into a pre-assigned wavelength $\lambda_N$ by a wavelength converter 512 in an optical wavelength multiplexing add/drop section 511, multiplexed with the other wavelengths by a wavelength multiplexer 513, output to optical fiber 514.

In contrast with this, as shown in FIG. 18, the above embodiments of this invention have the composition that the wavelength converter is disposed in the optical ring device. Namely, output data obtained from client 501 is selected by a switch 512 in the optical ring device 521, converted into a pre-assigned wavelength $\lambda_N$ by a wavelength converter 522 without being multiplexed on time axis, multiplexed with the other wavelengths by the wavelength multiplexer 513, output to optical fiber 514.

Thus, in the embodiments of this invention, the output-side wavelength is made to be narrow-band by the wavelength converter 522 disposed in the optical ring device 521. Therefore, it is not necessary to conduct the time-axis multiplexing, thereby the circuit composition until the output of signal can be simplified. Also, due to the simplified circuit composition, the protection topology of ring network can be constructed at a lower cost.

Although in the above embodiments the four-fiber ring connecting four optical fibers in the form of a ring is employed, the invention is not limited to such a composition. Alternately, two-fiber ring connecting two optical fibers may be applied, or a ring network formed by more than four optical fibers can be applied.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical ring system, comprising:
   a wavelength demultiplexing means to which wavelength-multiplexed optical signal to be sent through a first input path of an optical fiber from a previous node of multiple nodes composing a ring network is input and in which optical signal with each wavelength assigned to itself is demultiplexed and output to demultiplexed outputs;
   an optical ring means which is provided in a predetermined node of said multiple nodes and connected to said demultiplexed outputs to receive said each wavelength assigned and which is composed of:
      a failure existence judging means which terminates an overhead of each optical signal with a wavelength demultiplexed by said wavelength demultiplexing means and judges whether a failure occurs in regard to a wavelength in a previous section through which optical signal with the assigned wavelength is sent, and
      a switching means which, when said failure existence judging means determines the occurrence of failure, selects an alternative input path that allows optical signal with the wavelength to be transmitted from said previous node into said optical ring means via said demultiplexed outputs, while avoiding said first input path of said previous section incurring the failure; and
      a wavelength multiplexing means which multiplexes optical signal to be output from said optical ring means and then outputs it to an optical fiber connected to a next node composing the ring network.

2. An optical ring system, according to claim 1, further comprising:
   a wavelength changing means which changes the wavelength of optical signal to be output from said switching means.

3. An optical ring system, according to claim 1, further comprising:
   a bandwidth narrowing means which narrows the bandwidth of optical signal to be output from said switching means.

4. An optical ring system, according to claim 1, wherein:
   said switching means is input optical signal whose wavelength is changed into a predetermined input-side wavelength.

5. An optical ring system, according to claim 1, wherein:
   said first input path of said optical fiber is a work-line fiber and said alternative input path is a protection-line fiber, and when only work-line fiber with a predetermined wavelength incurs a failure, optical signal with the wavelength in the failure-occurring section is transmitted through a protection-line fiber provided for the same section.

6. An optical ring system, according to claim 1, wherein:
   for a wavelength which does not need to switch the transmission line in occurrence of failure, the input and output sides of said optical ring means are directly connected, so that neither detection of failure nor selection of transmission line by said switching means in occurrence of failure is conducted.

7. An optical ring system, comprising:
   plural nodes connected to each other through a first and a second optical fiber pairs, the first optical fiber pair being designated as a work line pair and the second optical fiber pair being designated as a protection line pair,
   each node comprising first and second wavelength multiplexing-demultiplexing sections, and at least one optical ring device,
   the first wavelength multiplexing-demultiplexing section being connected to a first segment of the first and second optical fiber pairs and the second wavelength multiplexing-demultiplexing section being connected to a second segment of the first and second optical fiber pairs,
   the first and second wavelength multiplexing-demultiplexing sections being connected to the optical ring device,
   the first wavelength multiplexing-demultiplexing section being controlled by the optical ring device to normally accept incoming optical signals from the work line pair of the first segment and the second wavelength multiplexing-demultiplexing section being controlled to normally accept incoming optical signals from the work line pair of the second segment,
   the optical ring device comprising
      a failure existence judging part which terminates an overhead of incoming optical signals with a wavelength demultiplexed by the first wavelength multiplexing-demultiplexing sections and judges whether a failure occurs in regard to a wavelength in an incoming portion of the work line pair of the first segment, and
      a switching part which, when the failure existence judging part determines a failure occurrence of the incoming portion of the first segment work line pair, reconfigures the optical ring device to accept the wavelength of the failure occurrence from an incoming portion of the protection line pair of the first segment, permitting continued input by the first wavelength multiplexing-demultiplexing section of the incoming optical signals through the first segment while avoiding the first segment work line pair having the failure occurrence.

8. The optical ring system of claim 7, wherein, the first and second wavelength multiplexing-demultiplexing sections each comprise individual wavelength output and input ports, the optical ring device comprises input wavelength converters connected to the individual output ports, output wavelength converters connected to the individual input ports, overhead terminating sections connected to the input wavelength converters and overhead generating sections connected to the output wavelength converters, a switch controller accepting overhead removed by the overhead terminating sections and providing overhead to the overhead generating sections, and a switching section for directing signals between the overhead terminating sections connected to the first wavelength multiplexing-demultiplexing section to overhead generating sections connected to the first wavelength multiplexing-demultiplexing section and to overhead generating sections connected to the second wavelength multiplexing-demultiplexing section, the failure existence judging part comprising the switch controller and controlling the switching section to normally accept incoming optical signals from the work line pair of the first segment and, upon determination of the failure occurrence of the incoming portion of the first segment work line pair, reconfigures the switching section to accept the wavelength of the failure occurrence from an incoming portion of the protection line pair of the first segment.

9. An optical ring device, comprising:

an A side and a B side;

individual wavelength input and output ports on the A side and the B side;

overhead terminating sections connected to the individual output ports;

overhead generating sections connected to the individual input ports;

a switch controller accepting overhead removed by the overhead terminating sections and providing overhead to the overhead generating sections; and a switching section for directing optical wavelength signals between the overhead terminating sections connected to the A side to overhead generating sections connected to the A side and to overhead generating sections connected to the B side, a failure existence judging part comprising the switch controller and controlling the switching section to normally accept incoming optical signals from A side input ports corresponding to a work line pair of a first optical line input segment and, upon determination of a wavelength failure occurrence in the work line pair of the first optical line input segment work line pair, reconfigures the switching section to accept the wavelength of the wavelength failure occurrence from A side input ports corresponding to a protection line pair of the first optical line input segment, permitting continued input at the A side through the first optical line input segment while avoiding the work line pair having the failure occurrence.

10. The optical ring device of claim 9, further comprising:

input wavelength converters and output wavelength converters, the input wavelength converters connected to the individual output ports, the output wavelength converters connected to the individual input ports, the overhead terminating sections connected to the input wavelength converters, and the overhead generating sections connected to the output wavelength converters.

11. The optical ring device of claim 9, wherein the optical ring device is configurable to narrow bandwidth of optical signal to be output from the switching section.

12. The optical ring device of claim 9, wherein, the switching controller, only during an A side wavelength failure occurrence, reconfigures the switching section to accept wavelengths from A side input ports corresponding to the protection line pair of the first optical line input segment.

13. The optical ring device of claim 9, wherein, the switching controller configures the switching section to concurrently accept wavelengths from A side input ports corresponding to the work line pair and from the A side input ports corresponding to the protection line pair of the first optical line input segment.

* * * * *